United States Patent [19]

Shelef

[11] 3,954,615

[45] May 4, 1976

[54] APPARATUS FOR SEWAGE TREATMENT AND WASTEWATER RECLAMATION

[75] Inventor: Gedaliahu Shelef, Kiron, Israel

[73] Assignee: Yissum Research Development Company of the Hebrew University of Jerusalem, Jerusalem, Israel; a part interest

[22] Filed: Feb. 28, 1974

[21] Appl. No.: 446,924

Related U.S. Application Data

[60] Division of Ser. No. 236,267, March 20, 1972, Pat. No. 3,839,198, which is a continuation-in-part of Ser. No. 109,263, Jan. 25, 1971, abandoned.

[52] U.S. Cl............................ 210/170; 210/241
[51] Int. Cl.² ......................................... C02C 1/04
[58] Field of Search ....................... 210/13–18, 210/150, 151, 170, 242, 319, 241; 261/92

[56] References Cited
UNITED STATES PATENTS

| 3,033,372 | 5/1962  | Riddick......................... 210/242 X |
| 3,462,360 | 8/1969  | McKinney........................... 210/14 |
| 3,470,092 | 9/1969  | Bernard............................. 210/15 |
| 3,534,857 | 10/1970 | Berk............................. 210/14 X |
| 3,547,811 | 12/1970 | McWhirter..................... 210/242 X |
| 3,589,997 | 6/1971  | Grutsch et al. ..................... 210/13 |
| 3,633,218 | 1/1972  | Lekberg........................ 210/242 X |
| 3,757,950 | 9/1973  | Zebley......................... 210/14 X |
| 3,837,492 | 9/1974  | DiBello........................... 210/150 |
| 3,847,811 | 11/1974 | Stengelin......................... 210/150 |
| 3,855,370 | 12/1974 | Dodd.............................. 210/170 |

Primary Examiner—Thomas G. Wyse
Attorney, Agent, or Firm—Lane, Aitken, Dunner & Ziems

[57] ABSTRACT

Process for treating sewage by using algal photosynthesis for removing contaminants from sewage. The sewage is treated in a channelled algae pond while the sewage meanders through the channels in the pond. The process includes integrated day-time and night-time cycles enabling continuous operation over a 24 hour period. An essential step in the process involves varying the flow rate between the day-time and night-time cycles with a cage aerator. The flow rate during the day-time cycle is controlled by the cage aerator so as to increase the amount of algae in the sewage that is exposed to light and bring about nutrient exchange between the bottom and surface of the sewage in the channels without stirring up the sludge in the channels. The rotational speed of the cage aerator is increased during the night-time cycle so as to agitate the sewage to stir up the sludge and beat air into the sewage to increase its oxygen content. Thus the process includes mechanically applying oxygen to the sewage and stirring up the sludge during the night-time cycle with the same apparatus used to increase the exposure of sewage to light during the day-time cycle. The process also includes the step of withdrawing the oxygen rich upper portion of the algae pond during the day-time cycle, enabling the effluent to be treated in an autoflotation unit.

Apparatus for carrying out process.

11 Claims, 11 Drawing Figures

APPARATUS FOR SEWAGE TREATMENT AND WASTEWATER RECLAMATION

CROSS-REFERENCE TO RELATED APPLICATIONS

This is a division of application Ser. No. 236,267, filed Mar. 20, 1972, now U.S. Pat. No. 3,839,198, which is a continuation-in-part of application Ser. No. 109,263, filed Jan. 25, 1971, now abandoned.

BACKGROUND OF THE INVENTION

Processes for treating raw sewage with channelled algae ponds are known. Exemplary of the known prior art processes is U.S. Pat. No. 3,462,360 entitled "Waste Treatment". An additional patent representing the state of the art is U.S. Pat. No. 2,867,945 entitled "Process of Photosynthetic Conversion of Organic Waste by Algal-Bacterial Symbiosis".

The known prior art algae-bacterial processes for treatment of sewage depend entirely upon algal photosynthetic reactions occurring during the daylight hours. In many of the prior art systems, although there is a constant flow of influent into the pond and effluent out of the pond, there is not a regulated flow of sewage throughout the channels of the pond during exposure to sunlight. Thus, these ponds are considered to be stagnant during exposure and treatment by sunlight. With this arrangement, where there is no regulated flow of the sewage in the pond channels, there is an inefficient transfer of oxygen to the bacterial phase.

An important part of the photosynthetic reaction which occurs in the algae pond during daylight hours is the production of oxygen. In fact, in accordance with the present invention, it has been discovered that enough oxygen can be dissolved in the algae pond because of the photosynthetic conversion of the waste to enable the utilization of an autoflotation unit without pressurizing dissolved air. Prior to the present invention, the amount of oxygen produced in the algae pond has been low and could not replace the pressurized dissolved air needed for flotation. Furthermore, in the prior art systems no oxygen is added to the system during the non-daylight hours.

Summary

In accordance with the present invention, a large amount of oxygen is produced in the algae pond during daylight hours and is effectively utilized to enable self-flotation. This is accomplished by exposing large portions of algae biomass in the pond to sunlight, thereby producing large amounts of oxygen and by withdrawing the upper portion of the algae pond which is rich in oxygen continuously during daylight hours.

Continuous operation of the process without the presence of light energy is accomplished by an improved aeration device which not only increases the exposure of the pond to sunlight during daylight hours but also introduces oxygen into the pond and stirs up the sludge during night-time operation. Thus, the invention is a process for the treatment and reclamation of domestic, agricultural and industrial wastewater utilizing a continuous flow type reactor in which the activity of the algae and bacteria is aided by mechanical mixing and mechanical aeration to provide the removal of organic matter and nutrients such as nitrogen, phosphorus, iron and other micro-nutrients. The system also contains a special outlet for continuously withdrawing only the upper portion of the pond during the day-time cycle to maximize the advantage of the high amount of dissolved oxygen formed in the reactor by the present process.

Accordingly, it is an object of the present invention to provide a more efficient apparatus for removing organic material from wastewater.

It is a further object of the invention to provide an apparatus for the removal of settable solids, suspend solids and dissolve solids in wastewater by one reactor.

An additional object of the invention is to provide an improved apparatus for the removal of undesirable chemical compounds such as pesticides, detergents, mercury and other heavy metals from wastewater by both bioadsorption and chemical precipitation.

It is still a further object of the invention to provide an improved apparatus for removing color, taste and odor causing impurities from wastewater by a bioadsorption process.

A further object of the invention is to provide an apparatus which reduces chemical dosages and the size of units necessary for physico-chemical treatment.

It is an additional object of the invention to provide an apparatus for wastewater treatment which yields a usable algal biomass as a by-product.

It is a further object of the invention to provide an apparatus which increases the amount of algae in the sewage of an algal-photosynthesis pond that is exposed to sunlight.

It is a further object of the invention to provide an apparatus in which the oxygen content of an algal-photosynthesis pond is increased.

It is a further object of the present invention to provide an apparatus wherein increased amounts of algae in an algal-photosynthesis pond are exposed to sunlight during daylight hours without stirring up the sludge in the channels of the pond.

It is a further object of the present invention to provide an apparatus for sewage treatment wherein there is an increased nutrient exchange between the bottom and the surface of the sewage in the channels of an algae pond.

It is a further object of the present invention to provide an apparatus for sewage treatment in which the effluent leaving a pond contains a level of dissolved oxygen high enough to enable the effluent to be treated in an autoflotation unit.

It is a further object of the present invention to provide an algae pond apparatus for sewage treatment wherein highly treated effluent is withdrawn during the daytime without the withdrawl of bacterial sludge and with the pond functioning as a large settling tank for the bacterial sludge during the daytime.

DESCRIPTION OF THE PREFERRED EMBODIMENTS

At the outset, the process and apparatus of the present invention are treated in their broadest overall aspects.

The process utilizes an accelerated photosynthetic system (APS) which is a combination of algal-bacterial and physico-chemical wastewater treatment especially adapted to regions with ample sunlight. It provides a high quality effluent at relatively low cost and is especially advantageous whenever wastewater reclamation is desired.

The APS is composed of two basic units: (1) a shallow baffled pond equipped with cage aerators (aeration brushes) and (2) a chemical flocculation and flotation algae separator unit. Chemical flocculation is accomplished with agents such as polyelectrolytes, ferric chloride, aluminum sulfate, ferric sulfate and lime. The effluent of the APS is suitable for discharge into receiving bodies of water, for irrigation use, for use in agriculture, including edible crops, public parks, golf courses and industrial re-use. The effluent is particularly suitable for further advanced treatment by a series of steps ending with treatment with activated carbon to produce potable water.

The economic advantages of the APS arise from the fact that the pond unit provides a combined, primary, secondary and part of tertiary treatment in a single unit. Also, due to the relatively high pH of the pond effluent, chemical clarification with polyelectrolytes or lime is more efficient and required chemical dosages of these agents are reduced.

Since algae consumes $CO_2$ during the photosynthesis process, the pH tends to rise to higher levels than would be the case if the $CO_2$ remained in the system. This reduces the chemical dosages of polyelectrolytes or lime required in the subsequent chemical flocculation and the high pH enhances the removal of nitrogen by the formation and evolution of ammonia into the atmosphere. The high pH also enhances the removal of phosphate, iron, manganese and other heavy metals by precipitation.

Figure 1:
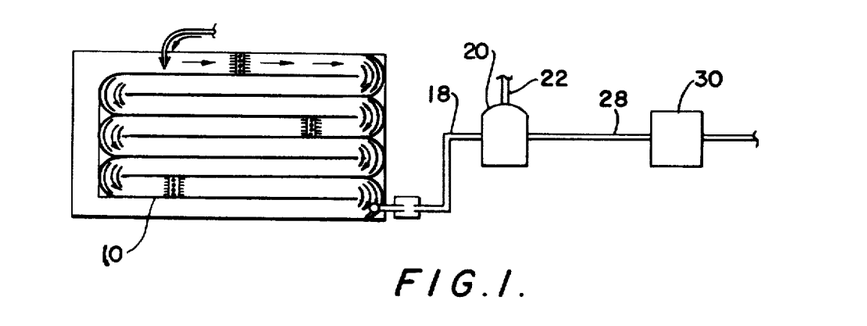
FIG. 1 is a schematic diagram of the process of the present invention for treating sewage.

The system utilizes an algae pond 10 into which an influent of raw sewage is introduced as shown by arrow 11. Prior to the introduction of the raw sewage, the algae pond is loaded with algae in the manner disclosed in U.S. Pat. No. 2,867,945 entitled "Process of Photosynthetic Conversion of Organic Waste by Algal-Bacterial Symbiosis", the teachings of which are incorporated herein by reference. The present system provides all the virtues of an extended aeration type activated sludge system in removing organic matter without producing excess sludge. Furthermore, with the present system, sludge age is infinite due to the fact that all of pond 10 is used as a settling tank during daytime hours when effluent is withdrawn.

Because of the combination of photosynthesis with an extended aeration type activated sludge, the present system has the advantages in that it removes, in addition to organic matter, nitrogen, phosphorus and other nutrients. Another advantage is that a large portion of the oxygen necessary for the process is provided by photosynthesis rather than solely by an energy consuming aeration. Thus, with the present system the larger portion of oxygen in the system is produced by photosynthesis whereas the activated sludge systems (which do not utilize photosynthesis) require the addition of large portions of oxygen through mechanical aeration.

Particularly useful in the present process are algae of the group including *Chlorella pyrenoidosa*, *Scenedesmus obliquus*, *Euglena gracilis* and comparable algae of an uncomplicated, elementary sort. All of these algae have the property of utilizing carbon dioxide and other nutrient materials in the presence of light, especially sunlight, not only to discharge oxygen but also to consume nitrogen, phosphorus and certain other chemical nutrients. The algae utilize their intake materials not only for the multiplication of the algal cells in number but also for the increase in size of the algal cells themselves. A particular algae, however, forms no part of the present invention and any micro-organism which functions in the manner described above is intended for use in the present process.

It should be noted at this point that the present process differs from the prior art processes in that with the present process it is possible to operate the system efficiently during the night-time without the use of artificial light, enabling continuous 24 hour operation of the system. It should be understood that although artificial light energy would enable a continuous cycle the cost of such an operation is prohibited. In the present process the continuous twenty-four hour operation is made possible by a combination of steps which include a day mixing cycle, controlling the flow rate or velocity of the effluent through the algae pond, and a night cycle to maintain a sufficient amount of oxygen in the system at all times. In this regard, the flow rate during the sunlight hours and non-sunlight hours differ, with oxygen being introduced into the system mechanically when sunlight is not available. These features of the invention are described in greater detail below. However, at the outset it is important to appreciate the effects that different flow rates have on the system. More specifically the flow rate during daylight hours must be slow when compared to the flow rate during non-daylight hours since it is undesirable to stir up the sludge during daylight hours. The reason for this fact is that if the sludge were stirred up it would block light and prevent it from penetrating deeply into the pond. Thus, the daytime flow must not stir up the sludge. However, in the evening hours this factor is not important since there is no light for the sludge to block. In fact, it is desirable to stir up the sludge in the absence of light to permit aerobic digestion of the sludge.

As the influent meanders throughout the pond in the manner described in greater detail below, the algae and organic waste progresses from the entrance point of the pond toward the exit thereof continually exchanging oxygen and carbon dioxide during the daylight when light is radiated into the pond surface.

The time period during which the sewage is retained in the pond for treatment ranges between 2 – 6 days, depending on a number of factors such as light intensity, hours of sunlight available, ambient temperature, level of contaminants in the sewage and type of algae predominating. During retention in the pond by the process generally known as symbiosis, the waste material comprising the sewage becomes available to the algae through bacterial activity. This waste material is composed of carbohydrates, proteins and fat materials.

Figure 2:
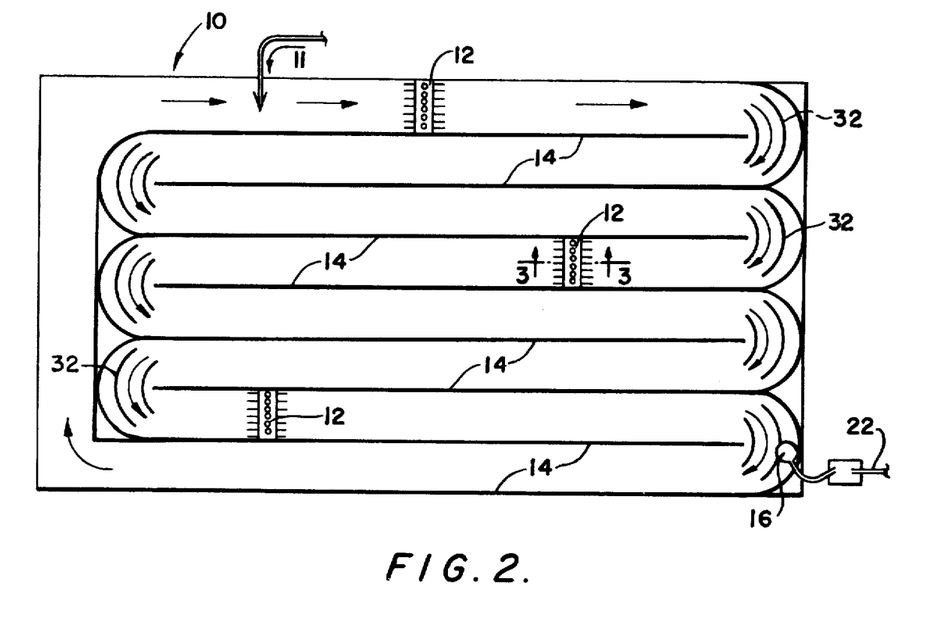
FIG. 2 is a schematic plan view of the algae pond of FIG. 1.

An important feature of the apparatus of the present invention is that it contains aeration brushes or cage aerators 12 positioned within the flow channels of the pond formed by various baffles or walls 14. The purpose of the aeration brushes 12 is two-fold. The brushes can be regulated to provide the required variable flow rates, which differ during the day and night cycles, and also provide a means for introducing oxygen into the pond which, as generally described above, is critical in order to operate the system over a 24 hour period.

After meandering through the pond, the treated influent exits from the pond via an effluent outlet 16.

The effluent outlet 16 is a floating discharge weir which forms an important port of the present invention. Effluent outlet 16 is positioned so that when it is open the upper layer of the algae pond is continuously extracted, leaving the sludge in the pond. The important consideration as to the positioning of the effluent outlet is that it be positioned so that during normal operation the sludge remains on the bottom of the pond with no sludge passing through the outlet. Sludge build-up in the pond is not a problem because with the long retention times of the present process, the sludge digests itself by endogenous respiration. Thus, the effluent outlet is positioned so that only the highly treated influent passes through, leaving the sludge settled in the bottom layer of the pond and leaving influent which has not been fully treated in the channels. With this arrangement, as algae leaves the system, further algae growth is possible, enabling still further treatment of waste with newly growing algae.

The effluent outlet is connected by a conduit 18 to a self-flotation unit or clarifier represented schematically in FIG. 1 by reference numeral 20. As a result of the increased amount of oxygen in the pond due to the combined action of the algae during the sunlight hours and the aeration brushes during evening hours, the effluent which passes into the vessel builds up pressure, forcing the biomass portion of the effluent through the top of the vessel through conduit 22 for further treatment. Since a conventional flotation unit may be advantageously employed in the present process, a detailed discussion of a flotation unit is unnecessary to an understanding of the present invention. However, an important feature of the present process is that the amount of dissolved oxygen which is present in the effluent is sufficient to supply the pressure necessary for the operation of conventional flotation units which depend on pressure for their operation.

As explained above, because of the reactions which take place within the algae pond, carbon dioxide is consumed which has the overall effect of increasing the pH of the algae pond. Since it is conventional to treat the effluent within the self-flotation unit with agents such as polyelectrolytes, ferric chloride, aluminum sulfate, ferric sulfate and lime, which are effective at various characteristic pH ranges, in order to cause flocculation and remove the residual bacteria present, pH adjustment of the effluent might be necessary. However, when polyelectrolytes or lime are employed as flocculation agents, the relatively high pH of the effluent is most advantageous. The step of pH adjustment, however, is conventional and thus is not described.

After the removal of the biomass in self-flotation unit 20, the effluent travels through conduit 28. Since the effluent discharged into conduit 28 has been subjected to primary, secondary and part of a tertiary treatment, it is suitable for use in irrigation, agriculture, public parks, golf courses and industry.

Optionally, the effluent emerging from conduit 28 may be subjected to ammonia stripping, recarbonation and filtration (usually dual or multi-media).

The effluent in conduit 28 is particularly suitable for further advanced treatment by a series of steps including treatment with activated carbon in filter 30 to produce potable water. When potable water is desirable, the present system offers many advantages because the algae in pond 10 removes a great deal of the taste and odor causing impurities that would otherwise have to be removed by the activated carbon. That is, part of the tertiary treatment required to produce potable water is accomplished by the pond itself. Therefore, when treatment with activated carbon to produce potable water is desirable, the degree of treatment necessary is reduced by following the process of the present invention. As is well known by those skilled in the art, one or more conventional steps of chlorination after treatment with activated carbon may also be necessary to produce potable water.

The following description relates to a unit which is constructed and operated to serve the sewage treatment needs of a community of approximately 1,300 persons. However, the community size for which the present process has optimum economical efficiency is a city of about 50,000 persons; although there is no limit to the size of the community which can be served by the process. Indeed, cities with a population of over a million could be efficiently served by the process. In this regard, the following construction parameters are to provide a detailed example and are not intended to be limiting in any way. Furthermore, the size of the plant is proportional to the community being served. Thus, the dimensions of the pond appearing below for a community of approximately 1,000 (1,300) would be increased by a factor of 50 to serve a community with a population of 50,000 people. However, channels having the same width and depth as the channels disclosed in the unit for a community of 1,300 persons may be utilized advantageously in a pond of larger or smaller area. However, a pond of larger area may contain longer lengths of channels than the pond serving the community of 1,300 persons or the width of the channels may be increased as desired.

Raw sewage, preferably following bar screening, is introduced into the APS pond 10 through inlet 11 as shown in FIG. 2. The pond is lined with concrete or asphalt to form meandering channels or ditches. The depth of the channels is 45 cm with a width of 1.2 meters across the upper surface. The upper surface area of the channels is approximately 300 meters square. The channels may be shaped to have the configuration of a trapezoid or a rectangle. Baffles 32 may be included in the channels where the channels curve to prevent the accumulation of materials along the walls of the channels.

The pond is provided with aeration brushes or cage aerators 12 to produce the flow or recirculation through the channels. All of the required movement or recirculation of the sewage within the pond may be advantageously accomplished solely by the action of the aeration brushes 12. The aeration brushes are driven by dual motors 40 or a vari-drive mechanism capable of operating the aeration brushes at variable speeds between 10–80 rpm.

Figure 3:
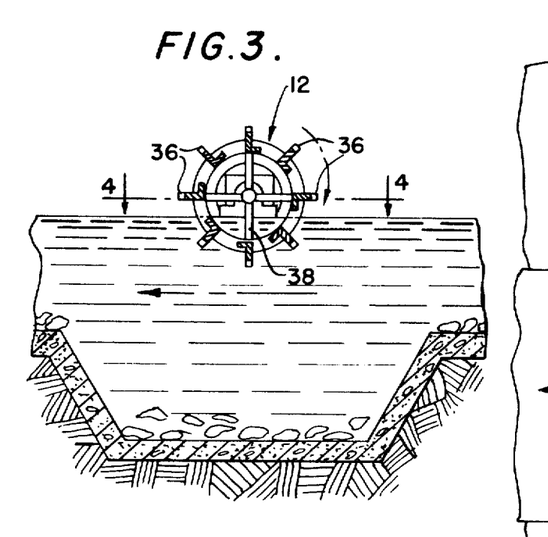
FIG. 3 is a fragmentary detailed transverse sectional view taken along line 3—3 of FIG. 2.

As is shown in FIG. 3, the depth of the channel in the area immediately below brushes 12 is deeper than the depth of the remainder of the channel. For channels that are 45 cm deep, the depth of the channel below the brushes is approximately 70 cm.

The main function of the aeration brushes during the daytime cycle is to create what is commonly called "the flashing light effect". To create this effect, the daytime flow rate of the liquid through the channel is carefully maintained between 2–20 cm/sec., with 3–12 cm/sec. being an optimum range. In this regard, one of the purposes of the brushes is to create a turbulence to bring the algae from the lower layers of the pond to the upper layer of the pond in order to expose algae from the lower layers to light. The upper layer is considered to be the upper fifth of the pond or approximately the top 10 cm. Thus, to accomplish this turbulence within the upper layer, the depth at which the blades of the cage aerators is set during the day cycle is approximately 15 cm. Although not shown in the drawing, the depth in the pond to which the blades can be submerged is adjustable. Thus, during the daytime cycle there is a turbulence created by the brushes which brings the lower portion of the top 15 cm of the pond toward the upper surface, thereby increasing the efficiency of the algae in the pond by exposing more algae to light than would otherwise be the case. It is important to emphasize, however, that with flow rates maintained between 2–20 cm/sec. there is little disturbance of the sludge in the bottom of the channels. This is significant because many advantages gained by the turbulence described above would be greatly reduced if the sludge were brought to the top surface since if sludge is present in the upper layer of the pond it would block out light and decrease the efficiency of the pond. Because of the advantage gained by the flashing light effect, the upper layer of the algae pond becomes supersaturated with oxygen, enabling more efficient flotation of the effluent in the flotation unit.

A further advantage derived from utilizing the foregoing flow rate is that the entire pond serves as a large settling tank, preventing the sludge from going into the effluent. Because of this fact, it is unnecessary to include a sludge return system, which has been found to be very costly, in the present system. Furthermore, because of the fact that the pond serves as a large settling tank, sludge age is inifinite.

The designed detention time in the pond system is between 2.5 to 4 days and it is a function of the amount of sunlight, temperature of the region and concentration of the sewage. The determination of the detention period and the algae concentration is determined by using algal growth kinetics as a function of solar irradiance, as is disclosed in the publication entitled "Algae Growth Kinetics in Waste Treatment" (a Ph.D. dissertation at the University of California (Berkeley), 1968, by G. Shelef), the teachings of which are incorporated herein by reference.

The kinetics of algae production rates are summarized below.

Net algal production rate is proportional to both the rate of photosynthetic oxygenation and the rate of nutrient incorporation into the biomass. Approximately 1.6 grams of oxygen is produced per gram of algae and between 65 to 90 milligrams of nitrogen are incorporated into one gram of algae. The rise in pH due to $CO_2$ utilization by algae is also proportional to algae net production, thus, the loss of nitrogen by ammonia evolution from pond surfaces can also be attributed by algae net production.

Within the range of algal specific growth rates found in photosynthetic wastewater systems fed by domestic wastewater, it has been repeatedly shown that the rate of algae production is determined primarily by the incident solar irradiance, rather than temperature or nutrient concentration. This is true under most climatic conditions, where algal wastewater treatments are being used, and this excludes extreme conditions where high solar irradiance levels are coupled with extremely low temperatures.

The relationship between algae production and irradiance has been formulated. The gross production of algae, $P_a$, (expressed in grams per square meter per day), as a function of the incident irradiance, $I_t$, (measured herein in calories per cm² per hour), in an optically dense culture of algae, is given as follows:

$$P_a = E_m I_s \int_{t_0}^{t_f} \left[ p + E_i \left( \frac{I_t}{I_s} \right) - E_i \left( \frac{I_t}{I_s} \right) \exp(-p) \right] dt \qquad 1$$

$E_m$ denotes the dimensional thermodynamic light conversion efficiency, which is a function of the light spectral distribution and can be expressed as follows:

$$E_m = \frac{3.92 \times 10^{-3}}{J \cdot q \cdot Rt} \int_{\lambda = 400}^{700} Q_\lambda \, I_{\lambda R} \, d\lambda \qquad 2$$

where $J$ is the algal chemical energy content, which is approximately 5.5 cal/mg, $q$ is the quanta requirement (approx. 8), $Rt$ is the total relative energy within the visible spectral range, $Q_\lambda$ is the relative quantum yield coefficient, $I_{\lambda R}$ is the relative energy per increment of wavelength, while $\lambda$ denotes the wavelength in millimicrons.

$I_s$ in Equation (1) is the saturation irradiance, which can be assumed to be 2.5 cal/cm²-hr, $t$ is the time in hours and $E_i$ is the exponential integral operator.

The value of $p$ is given by the following equation:

$$p = 1_n \frac{I_t}{I_b} \qquad 3$$

where $I_b$ denotes the basal irradiance of algal photosynthesis, which can be assumed as 0.12 cal/cm²-hr, $1_n$ is the natural logarithm.

The net algae production rate $P_n$ is given as follows:

$$P_n = P_a - K_a C_c d \qquad 4$$

where $K_d$ is the decay rate, which can be approximated for practical purposes as 0.125 day; $C_c$ is the algae concentration expressed as volatile suspended solids (VSS) in mg/l and $d$ is the depth of the photosynthetic system in meters.

Whenever the culture of algae is not optically dense, i.e. $I_d > I_b$, Equation 4 would change as follows:

$$P_n = P_a - K_d C_c d - E_m \int_{t_0}^{t_f} I_d \, dt \qquad 5$$

here $I_d$ is defined as the irradiance at depth $d$, and it can be calculated as follows:

$$I_d = I_t \exp(-\alpha C_c d) \qquad 6$$

where $\alpha$ is the extinction coefficient according to Beer-Lambert Law. In Equation 5 it is assumed that $I_d < I_s$, which is almost always the case in practice.

Using the principles of continuous cultures and assuming that in the photosynthetic pond described above, the conditions of continuously stirred tank reactor (CSTR) are practically maintained, then it can be shown that:

$$P_n = \mu_n C_c d \qquad 7$$

where $\mu_n$ is the net specific growth rate of the algae biomass expressed in day$^{-1}$. It can also be shown that in such a continuous system $\mu_n = D$, where $D$ is the dilution rate, which is the reciprocal of the detention period, $T$.

From Equations 1, 4 and 7, it can be shown that $$C_c = \frac{P_n}{(\mu_n + K_d) d} \qquad 8$$

Figure 8:
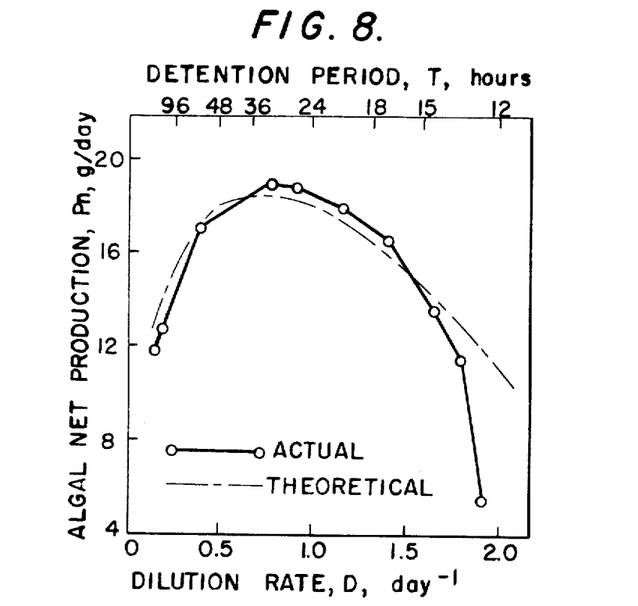
FIG. 8 is a graph showing the net production rate of *Chlorella pyrencidosa* as a function of the dilution rate, D, and the detention time, T.

FIG. 8 shows the net production rate of *Chlorella pyrencidosa* as a function of the dilution rate D and the detention time T and describes the relationship between the applied dilution rate and algae net production in experiments held under controlled conditions in the laboratory, where artificial light was used. Experiments were held under constant illumination with quartz-iodine lamps at 27° C in a 9.7 liter Algatron chemostatic reactor.

The dashed line in FIG. 8 indicates the theoretical or predicted relationship between the algae net production and the dilution rate (or the detention time) using the above equations, while the solid line denotes the experimental results.

At high dilution rates the production is lowered due to a washout of the culture and a loss of light by the penetration of light through the optically diluted culture ($I_d > I_b$). At too low dilution rates the production of algae is again reduced due to "crowdiness" of the culture and the penetration of light to only the upper part of the culture.

Algae concentration in the pond 10 is usually between 50 mg/l and 250 mg/l and it can reach 400 mg/l and more with most of the algae being in suspension. The pond is also rich in aerobic bacteria which is both in suspension and in settled sludge in the pond. Photosynthetic oxygenation occurs during the daylight hours and the dissolved oxygen levels reach supersaturation levels. The concentration of dissolved oxygen can reach 30 mg/l in the afternoon. In the evening, oxygen levels are reduced to such a degree (2.5 mg/l) that mechanical aeration is required.

This mechanical aeration is provided by aeration brushes 12 that are operated according to the dissolved oxygen levels as monitored continuously in the pond. Whenever the dissolved oxygen level in the pond is lower than 2.5 mg/l, the brushes 12 are operated at speeds of about 70 rpm. During this operation, the brushes may be lowered in the pond up to a depth of approximately 24 cm. With such agitation, the sludge is stirred up from the bottom of the pond and through exposure to the air beaten into the pond, the sludge is digested by endogenous respiration or aerobic digestion. The pond is therefore oxygenated and aerated effectively all the time and the relatively long retention provides time for aerobic digestion of the sludge to occur. Thus, there is no need for separate treatment of primary sludge.

Figure 4:
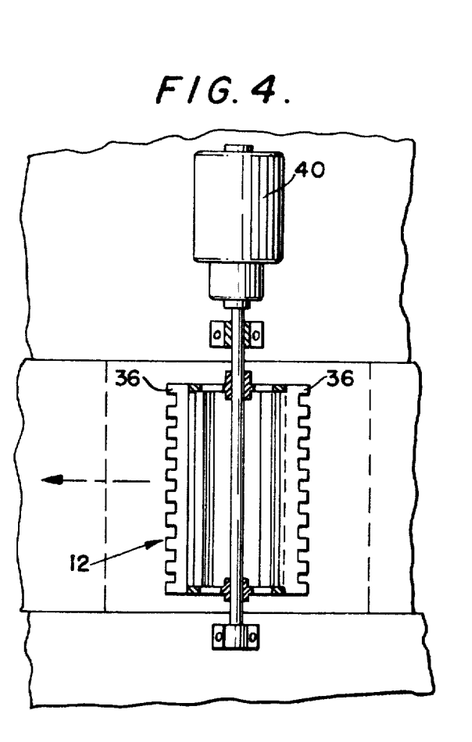
FIG. 4 is a horizontal sectional view taken along line 4—4 of FIG. 3.
Figure 5:
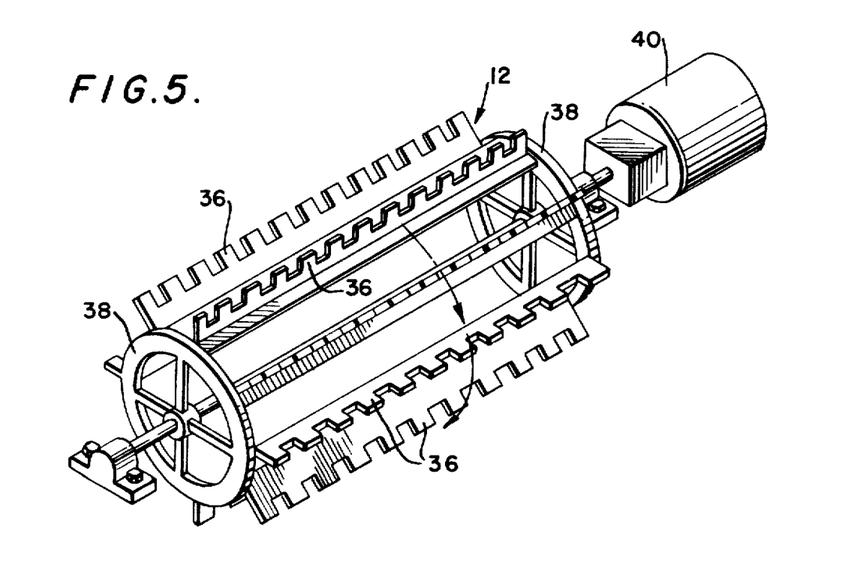
FIG. 5 is a perspective view of the aeration brushes 12 of FIG. 2.

FIGS. 3–5 show aeration brush 12 which provides the means for providing the necessary velocity and turbulence and introducing oxygen into the system which is necessary to enable the process to be run continuously over a 24 hour period. The brush itself is formed from beaters 36 which are mounted on a skeletal frame 38 driven by a variable speed motor 40 to variably control the rotation of the brushes. The motor is capable of rotating the brushes at speeds between 8–80 rpm. When operated in the evening hours, the brushes rotate at approximately 70 rpm. During the day-time cycle, the brushes rotate at speeds between 12–20 rpm.

As indicated above, the aeration brushes 12 may be slidably mounted so that the submergence depth of beaters 36 may be varied as desired. The range for submergence of beaters 36 into the pond is between 8–24 cm.

As is shown in FIG. 3, the channel is deeper at the area immediately under the aeration brushes. It has been discovered that increasing the depth of the channel at this point in the system enables a solubility gradient which increases the amount of oxygen that can be dissolved into the liquid by aeration brushes 12. For channels 45 cm deep, the depth of the pond below the brush may range between 75–100 cm.

As stated above, the amount of oxygen in the pond is monitored. Thus, the speed at which the aeration brushes rotate in order to deliver oxygen into the pond from the ambient air is regulated in accordance with the monitorind device (not shown). When the level of dissolved oxygen is below 2.5 mg/l, the brushes are operated at near full speed. It has been discovered that during night hours operation it is necessary to deliver 300–500 lb. of oxygen per acre foot during the entire night operation. Normally, the aeration brushes are run for approximately 7 hours at 70 rpm during the non-daylight hours. The flow rate of the algae pond at night is maintained at a range between 25 to 35 cm/sec. during the aeration operation. This can be accomplished by intermittent operation of the brushes in response to the monitoring device.

Thus, in accordance with the present invention, during the sunlight hours the velocity of the pond is maintained between 2–20 cm/sec., with 3–12 cm/sec. being the optimum velocity. This rate of movement increases algae activity by applying the flashing light effect of photosynthesis. It also increases the contact between the bacterial phase and organics and between the algae and the nutrients.

During night operation, aeration brushes are applied at a full speed by a variable speed arrangement of dual motors. The night aeration is performed in order to maintain a level of dissolved oxygen after all the photosynthetic oxygen has been consumed and move the liquid at a speed between the range of 25 to 35 cm/sec. This usually occurs between the hours of 11 p.m. and 6 a.m. since by 11 p.m. the amount of oxygen in the pond is reduced to a low level. The aeration brushes also provide an intense mixing and aeration for the bacterial phase as well as the algal phase and stimulates the activated sludge. It should be understood, however, that although the aeration brushes shown are preferred since they have been found to introduce large amounts of oxygen as well as maintain the required movement of the algal pond, other aeration means are usable in the process. Such means include propeller pumps, boat propellers and small vertical aerator type propellers.

In connection with the day-time flow rate, it has been discovered that a slow moving pond is far superior to one which is vigorously agitated. This is principally due to the fact that high velocities and the resulting agitation stirs up the sludge in the channels, thus blocking the light. Thus, the disclosed flow rate is critical to obtain optimum operation.

Since the pond itself is not deep, it is lined with asphalt although polyethylene sheet is a satisfactory material for retaining the materials present in the pond. Concrete lining is required only near the aeration brushes where there is strong turbulence. Once the site is excavated and the ground levelled, the degree of lining required is minimal. The meandering channels can be made by dividers of corrugated asbestos, wood or galvanized corrugated steel. Earth embankments lined with asphalt can also serve as the baffles forming the meandering channels.

Figure 6:
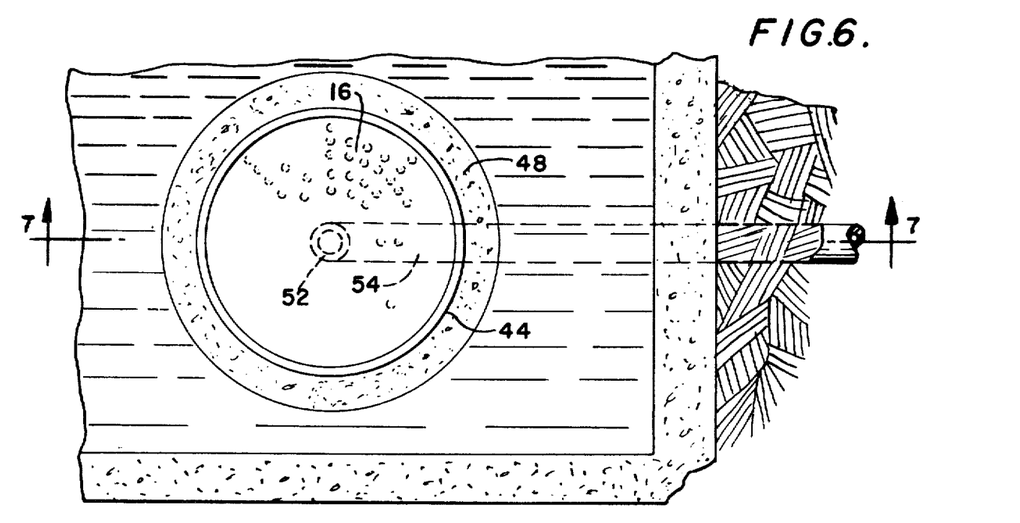
FIG. 6 is a plan view of the outlet of the algae pond of FIG. 2.
Figure 7:
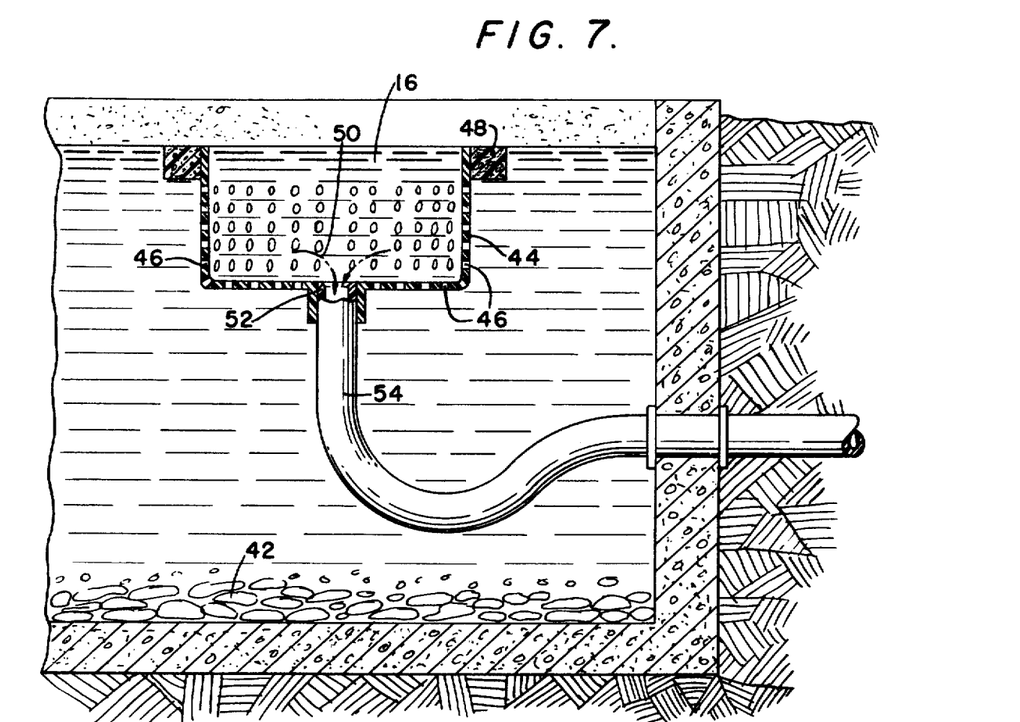
FIG. 7 is a sectional view of the outlet taken along line 7—7 of FIG. 6.

Detailed views of outlet 16 of algae pond 10 are shown in FIGS. 6 and 7. In accordance with the present invention it has been discovered that the upper layer of the algae pond (upper one-fifth or in the case of the algae pond of FIGS. 1 and 2, the upper 10 cm) contains the highest level of dissolved oxygen. Because of the slow movement of the sewage through the channels, particularly during the day cycle, the activated sludge 42 settles to the bottom of the pond and remains settled due to the lack of turbulence in the channels. Thus, the upper portion of the pond contains less contaminants and is more fully treated than the lower portions. Because of the foregoing, the outlet 16 is constructed so that when opened, it continuously extracts the upper level of the pond. This is accomplished by a floating basin 44 having a plurality of apertures 46 beneath the surface of the pond. The basin 44 is preferably formed of a plastic material and is buoyed by floats 48 formed of polyurethane foam or some other suitable buoyant material. The liquid passing through apertures 46 travels in the direction of arrow 50 and exits through drain 52 and is passed from the pond via a flexible conduit 54. Conduit 54 is connected to a valve (not shown) which enables the flow of effluent to be stopped when extraction is undesirable, which is usually the case during the evening cycle. Conduit 54 may be formed of rubber, neoprene, polyethylene or some other suitable flexible liquid conducting material. Since the depth of the liquid in the pond can vary, it is important that conduit 54 be flexible so that outlet 16 may maintain itself at the proper depth in the channel, i.e. to extract liquid from the upper fifth of the pond. Conduit 54 may be connected to a suitable pump (not shown) outside of the pond so that the liquid leaving the pond may travel into the flotation units for further treatment. It is important to note that because only the oxygen rich layer of the pond is extracted, the self-flotation units which relay on dissolved oxygen for their operation may be more effectively employed than in the prior art process. It is to be understood, however, that any means of continually extracting the upper layer of the algae pond is intended as a part of the process since the function of outlet 16 is to extract this oxygen rich layer. Furthermore, the level at which the outlet is set is a function of the oxygen gradient of the pond.

For the pond of FIGS. 1 and 2, an outlet may be used which withdraws the top 2 to the top 15 cm of the pond. The optimum setting of an outlet is a setting which extracts the top 5 cm of the pond. However, withdrawing the top 15 cm is satisfactory and is consistent with the objects of this invention.

Accordingly, the objects of the invention are accomplished by an integrated day mixing cycle followed by a night-time cycle performed in the manner described above. The integrated cycles include photosynthetic treatment during the day-time with mechanical mixing and aeration during the evening. The foregoing cycles maintain an aerobic system with a sufficient amount of dissolved oxygen present in the algae pond at all times and maximizes the aerobic degradation of organic matter and the aerobic digestion of the sludge. Furthermore, the mechanical mixing and aeration supplies the bacterial biomass with oxygen as well as organic substrate, enabling the evening hours to be effectively utilized. The mixing and aeration also performs a further function in that it supplies the algae population with carbon dioxide and nutrients which would otherwise remain settled on the bottom of the pond during the evening hours.

The controlled cycles also expose an increased amount of algae to light which by the flashing light effect increases the conversion efficiency of the photosynthesis during the day-time. Further, the controlled cycles reduce light inhibition and settlement of the algae.

By drawing an effluent from the top layer of the pond the effluent is richer in dissolved oxygen and algae biomass has a higher pH, enabling more efficient flocculation of the biomass. Further, the effluent at the top of the pond contains a lower amount of nitrogen and phosphorus.

Following the foregoing integrated cycles results in an efficient and improved wastewater reclamation process. The process, however, may be further improved by the following procedure.

Raw sewage is continuously introduced into the pond. At dawn all aeration and movement of the pond is terminated. The termination of aeration can be controlled manually or switched off by irradiance intensity control by the action of a photocell. A complete early morning switch off allows the bacterial flocs to settle down and the algal photosynthetic activity to take place. Aeration and mixing is not applied for about an hour to an hour and a half during the first hours of daylight, allowing the foregoing settling to occur. During this period the outlet is set in a off position so that no effluent flows through conduit 54. Thereafter, the day mixing cycle is applied at a velocity of between 2–20 cm/sec. The effluent outlet 16 is first opened no sooner than 2 hours after the commencement of the day mixing cycle. The effluent drawing-off cycle is optimally begun between the hours of 11 a.m. to 1 p.m. and terminates between 4 to 6 p.m. For best results, the effluent is drawn off only from the top 2 cm of the pond during these hours. During the first hours of the day mixing cycle it is possible to vary the mixing rate or apply mixing intermittently. For example, initially in the early morning hours the day cycle may be run for 10 minutes and then shut down for 10 minutes. At noontime, however, because of the intense amount of energy present, mixing is preferably run in a continuous manner between 2–20 cm/sec. The day mixing is reduced or stopped as irradiance decreases in the evening, at which time outlet 16 is set in an off position. This reduction can also be automatically controlled by a photocell. The reduction of mixing fully utilizes the super-saturation of oxygen developed in the day-time for continuous oxygenation during the early evening hours. At a time during the evening when dissolved oxygen levels drop, night aeration is turned on. Night aeration provides the necessary turbulence to mix and agitate the bottom sludge for maximum aerobic digestion. The optimum flow rate during the night aeration is approximately 30 cm/sec. The timing cycle and the duration of operation of the night aeration is controlled by the dissolved oxygen level in the liquid. Once the dissolved oxygen level is below a 2.5 mg/l level, the night aeration is switched on. Once the dissolved oxygen reaches a level of 7–8 mg/l, the night aeration is switched off. At dawn, all movement is terminated and the cycles are repeated.

The sewage was bar-screened and comminuted before being introduced into the pond.

A 7.0 m$^3$/hr (1750 gal/hr) rectangular flotater was used for separating the algal biomass from the pond effluent being treated with alum or ferric chloride.

The influent and effluent composition analyses given in Table 2 were performed on composite samples using Standard Methods procedure. Algae concentrations were measured as volatile suspended solids (VSS) and were correlated to algal cell-count, which was performed regularly.

Sunlight incident irradiance levels were provided daily by the Climatology Laboratory at the Hebrew University in Jerusalem, while light penetration and transmittance measurement were taken in the pond itself. Dissolved oxygen levels were measured by Yellow-Spring D.O.-meter, which was checked and calibrated regularly by chemical D.O. analysis.

The accelerated photosynthetic pond was operated between November 1969 and August 1971. The results given in this example summarize the experiments in June 1970, June 1971, December 1969 and December 1970. The months of June and December represent the months of maximum and minimum solar incident irradiance correspondingly.

Table 1 gives the average hourly solar irradiance levels for June and December as measured during the experiments and which are introduced in Equations 1, 2, 5 and 6 above.

Table 1

Average Hourly Solar Incident Irradiance Values in Jerusalem during the Experimental Period (gram-calories per cm$^2$)

| Hour | 5 | 6 | 7 | 8 | 9 | 10 | 11 | 12 | 13 | 14 | 15 | 16 | 17 | 18 | 19 | total daily |
|---|---|---|---|---|---|---|---|---|---|---|---|---|---|---|---|---|
| June | 3 | 15 | 33 | 52 | 70 | 81 | 90 | 92 | 90 | 82 | 72 | 56 | 37 | 15 | 2 | 789 |
| December | | | 2 | 14 | 32 | 45 | 52 | 56 | 54 | 44 | 30 | 12 | | | | 341 |

Example 1

Experiments were conducted in a 300 square meters accelerated photosynthetic pond similar to the pond shown in FIGS. 1 and 2 at the Environmental Health Laboratories of the Hebrew University of Jerusalem, These experiments were aimed at determining the relationship between the dilution rate (or detention period) and the photosynthetic activity, as expressed by the net production of algae biomass. The kinetics of algae production with respect to solar incident irradiance served for the construction of a mathematical model for predicting algae biomass production as a function of the hydraulic dilution rate under given solar irradiance levels.

During the course of the experiments described in this example, the effluent was drawn off only at daytime, and from the top layers of the pond. Thus, the effluent contained mostly algal suspension. The bacterial sludge was accumulated at the lower 5 cm of the pond.

The pond was fed with domestic raw sewage from a residential area near Jerusalem, the composition of which is given in Table 2 below. It should be noted that the raw wastewater of Jerusalem is particularly strong due to low water consumption per capita in this area.

Figure 9:
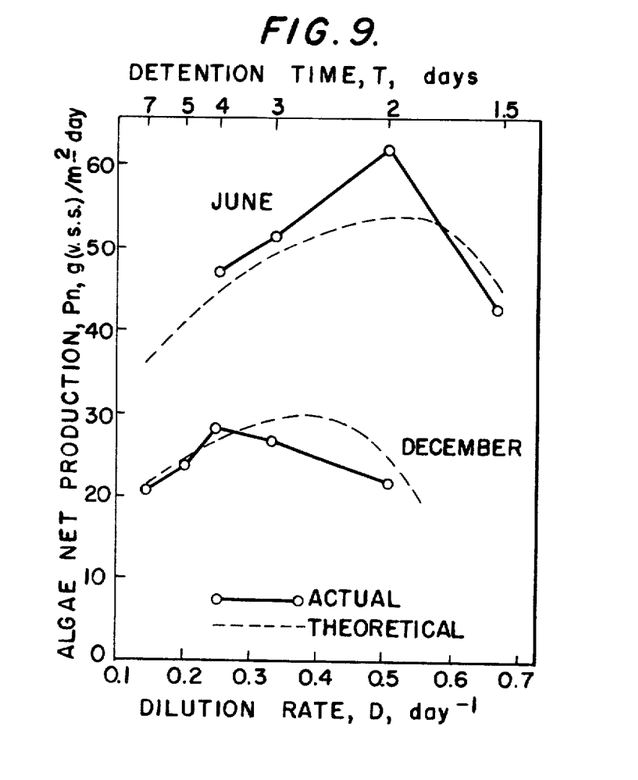
FIG. 9 is a graph showing the relationship between the dilution rate, D, or detention time, T, and the net production of algae in the accelerated photosynthetic pond in Jerusalem.

FIG. 9 describes the calculated (theoretical) and actual relationship between the dilution rate (or detention time) and the net algae production in the photosynthetic ponds during June and December of the two experimental years. Although the actual depth of the pond was 0.5 m, the depth, $d$, was assumed as 0.45 m (18 inches) rather than 0.5 m since 5 cm were alloted for the bacterial sludge.

In all experiments, the predominate algae genus was Chlorella (more than 85% of the biomass) while the rest of the genera were Scenedesmus, Euglena and Chlamidomonas.

It should be noted that although the irradiance levels in June were more than twice of those in December (Table 1), the calculated maximum algae production rates were 53.6 g/m$^2$-day in June and 30.3 g/m$^2$-day in December. This corresponds with the fact that softer light is being utilized more efficiently than stronger light. Two distinct dilution rates correspond with the calculated peak algae production, namely, 0.55 day$^{-1}$ (1.82 days detention) in June and 0.38 day$^{-1}$ (2.64 days detention) in December.

The actual algae production rate did not correspond adequately to the calculated ones according to the December experiments, particularly in the shorter detention time. The discrepency in the higher peak values of the actual production rate in June is explained by the higher bacterial suspended matter present due to a too vigorous daytime agitation at the time of sampling.

Figure 10:
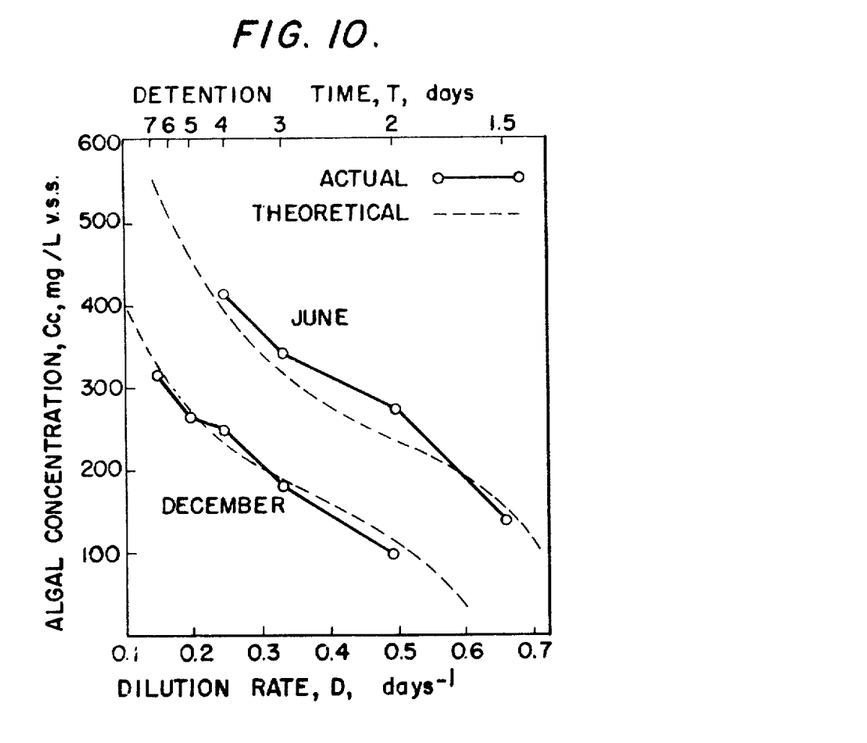
FIG. 10 is a graph showing the relationship between the dilution rate, D, or detention time, T, and the concentration of algae in the photosynthetic system.

FIG. 10 describes the relationship between the applied dilution rate and the concentration of algae in the photosynthetic system (both the theoretically predicted relationship and the actual one).

In both FIGS. 9 and 10, the agreement between the calculated prediction and the actual results was less evident than in FIG. 8, where the experiment was under fully controlled conditions. However, the degree of discrepency was small enough to allow the use of the theoretical model in order to predict both algae production and algae concentration with respect to irradiance levels, under given detention periods. Some correction factor should be introduced at the higher dilution rates.

Figure 11:
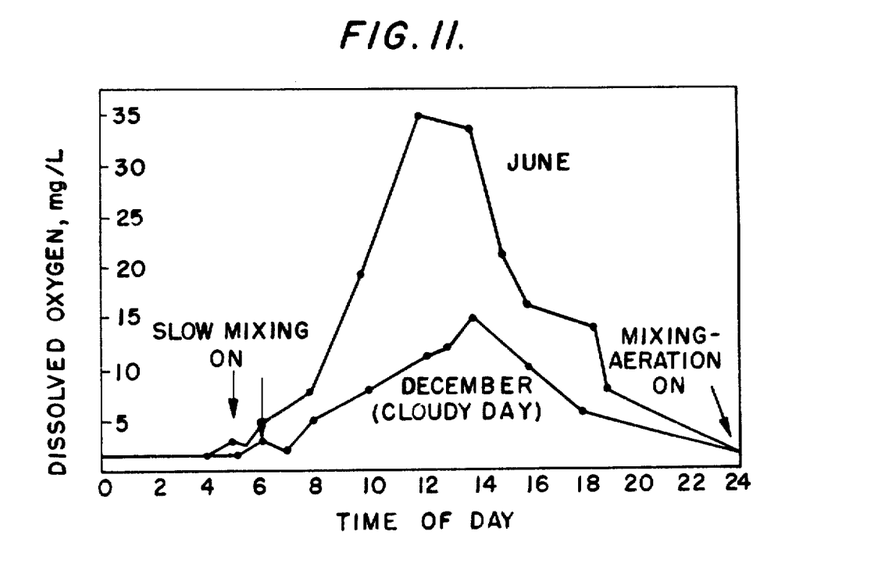
FIG. 11 is a graph showing dissolved oxygen (D.O.) levels during two typical days in June and December through measurements taken at a 5 cm depth.

The photosynthetic oxygenation, as expressed by the resultant dissolved oxygen levels in the pond, is given in FIG. 11. The D.O. measurements were taken at the depth of 5 cm (2 inches) from the pond surface. The D.O. levels reach supersaturation even in wintertime.

The performance of the pond system under the conditions of both June and December under two selected detention periods is given in Table 2. The strength of the Jerusalem wastewater should be noted as the performance of the pond is evaluated.

Table 2

Performance of the Accelerated Photosynthetic Pond at Two Experiments

| Item | Influent mg/l | Effluent June mg/l | Effluent December mg/l |
|---|---|---|---|
| Detention Periods [days] | — | 2.0 | 4.0 |
| BOD (non-filtered) | 590 | 90–120 | 70–110 |
| BOD (filtered) | — | 4–10 | 8–18 |
| COD (non-filtered) | 1200 | 350–520 | 110–260 |
| COD (filtered) | — | 70–130 | 45–115 |
| Suspended Solids (non-filtered) | 440 | 330 | 280 |
| Volatile suspended Solids (non-filtered) | 380 | 280 | 240 |
| Total Nitrogen (as N) (non-filtered) | 70 | 24 | 42 |
| (filtered) | — | 8–16 | 16–28 |
| Ortho-Phosphate (as P) | 17.5 | 2–5 | 4–6 |

Since the separation of the algal biomass from the effluent is mandatory in order to produce adequate effluent, the Jerusalem pond is followed by a coagulation-flotation process. However, the high values of nitrogen and phosphorus removal should be noted. This is due to the incorporation of nutrient into the algae biomass as well as precipitation of phosphates and the evolution of $NH_3$ due to the high surface pH which develop in the pond during daytime.

Thus, the use of ponds in accordance with the present invention as a controlled wastewater treatment where the photosynthetic acitivy of algae is maximized, is demonstrated in the Jerusalem experiments.

The experiments further demonstrate that the rate of algae production and the concentration of algae with respect to applied dilution rate (or detention time) can be formulated and calculated according to the incident solar irradiance levels. This can be done by using algae growth kinetics and continuous mixed culture theories. The predicted levels of algae production and concentrations are close to actual levels, although in determining the optimum dilution rate, some correction should be made.

The experiments also show that the removal efficiency of organic matter and nutrients in the pond system is relatively high after the algae biomass is separated from the effluent.

As explained above, one of the advantages derived from utilizing the foregoing process and apparatus is that sludge age is infinite and separate handling of the sludge is unnecessary. It should be noted, however, that when treating high strength sewage over prolonged periods of time, it may be necessary to remove some of the sludge. This may be accomplished by vacuuming the sludge from the pond in the conventional manner. It might also be accomplished by agitating the pond to stir up the sludge and withdrawing the sludge from the pond through the outlet 16. Another alternative would be to empty the pond periodically (once a year) in order to remove the sludge. It is to be emphasized, however, that for many applications sludge removal will be unnecessary when the process and apparatus of the present invention is utilized.

Thus, by following any of the procedures set forth above, the objects of the invention are accomplished.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefor intended to be embraced therein.

I claim:

1. In an apparatus for treating wastewater with algae comprising a pond containing means for channeling said wastewater along a predetermined endless path in said pond and means for aerating and maintaining the flow of said wastewater along said predetermined path, the improvement wherein the depth of said pond beneath said aeration means is greater than the depth of said predetermined path in the remaining portions of said pond, said greater depth being sufficient to provide a solubility gradient which increases the amount of oxygen than can be dissolved into the liquid by said aeration means.

2. In the apparatus of claim 1, the further improvement wherein the ratio of the depth of the pond beneath said aeration means to depth of the remainder of the pond is about 70–100 to 45.

3. In the apparatus of claim 1, the further improvement comprising an outlet means which extracts wastewater only from the upper fifth of the pond.

4. In the apparatus of claim 3, the further improvement wherein said outlet means being a floating outlet.

5. In the apparatus of claim 4, the further improvement wherein said floating outlet extracts wastewater only from about the top 2 to about the top 15 centimeters of the pond.

6. In the apparatus of claim 5, the further improvement wherein said floating outlet extracts wastewater only from the top 5 centimeters of the pond.

7. In the apparatus of claim 1, the further improvement comprising means to position said aeration means in a manner to agitate only the top one-third of the pond.

8. In the apparatus of claim 7, the further improvement comprising means to raise and lower said aeration means.

9. In the apparatus of claim 8, the further improvement comprising means to raise and lower said aeration means to provide agitation of the pond to a depth of from about 8/45 to about 24/45 of the depth in said remainder of the pond.

10. In the apparatus of claim 1, the further improvement comprising means to control the rate of aeration and flow of said wastewater in said pond.

11. In an apparatus for treating wastewater with algae comprising a pond containing means for channeling said wastewater along a pedetermined endless path in said pond and means for aerating and maintaining the flow of said wastewater along said predetermined path, the improvement wherein the depth of the pond beneath said aeration means is greater than the depth of said predetermined path in the remaining portions of the pond and the ratio of the depth below the aeration means is in the ratio of 70–100 to 45, and comprising a floating outlet of sufficient size to extract liquid only from the top fifth of the pond, means to raise and lower said aeration means, and means to control the rate of aeration and flow of said wastewater in said pond.

* * * * *